(12) United States Patent
Christie et al.

(10) Patent No.: US 7,625,648 B2
(45) Date of Patent: Dec. 1, 2009

(54) ELECTROCHEMICAL CELL ASSEMBLY

(75) Inventors: Gervase Maxwell Christie, Buffalo, NY (US); David Matthew Reed, East Amherst, NY (US); Zhonglin Wu, Bettendorf, IA (US); Deno Georgaras, Bettendorf, IA (US)

(73) Assignee: Praxair Technology, Inc., Danbury, CT (US)

( * ) Notice: Subject to any disclaimer, the term of this patent is extended or adjusted under 35 U.S.C. 154(b) by 176 days.

(21) Appl. No.: 11/507,492

(22) Filed: Aug. 22, 2006

(65) Prior Publication Data

US 2008/0047828 A1 Feb. 28, 2008

(51) Int. Cl.
*H01M 2/02* (2006.01)
*C25B 9/00* (2006.01)
(52) U.S. Cl. .......................... 429/17; 204/66
(58) Field of Classification Search .............. 204/266, 204/286, 279, 280, 290; 429/12, 17, 34, 429/19, 27, 30; 422/120, 122
See application file for complete search history.

(56) References Cited

U.S. PATENT DOCUMENTS 5,871,624 A * 2/1999 Crome .................... 204/286.1
6,042,703 A 3/2000 Adler et al.
6,090,265 A * 7/2000 Adler et al. ............ 205/615
6,117,288 A 9/2000 Adler et al.
6,849,296 B2 2/2005 Wu et al.

FOREIGN PATENT DOCUMENTS

| EP | 0 983 786 A2 | 3/2000 |
|---|---|---|
| JP | 6005293 | 1/1994 |
| JP | 7326373 | 12/1995 |
| JP | 9115527 | 5/1997 |
| JP | 9129251 | 5/1997 |
| JP | 20050187241 | 7/2005 |

* cited by examiner

*Primary Examiner*—Patrick Ryan
*Assistant Examiner*—Monique Wills
(74) *Attorney, Agent, or Firm*—David M. Rosenblum

(57) ABSTRACT

An electrochemical cell assembly in which one or more grounded conduits, that can be an oxygen product tube or simply inlets or outlets, are connected to the electrically driven oxygen separator. In order to prevent the conduit(s) from degrading due to electrochemical reduction due to the electrical potential produced between the electrically driven oxygen separator(s) and the grounded conduit or conduits, a conduit is formed in whole or in part by a ceramic material that is an electric insulator and that is also resistive to electrochemical reduction. The ceramic material comprises distinct phases of magnesia and spinel or magnesia, spinel and yttrium aluminate.

6 Claims, 1 Drawing Sheet

ELECTROCHEMICAL CELL ASSEMBLY

FIELD OF THE INVENTION

The present invention relates to an electrochemical cell assembly in which one or more electrically driven oxygen separators are powered by an electrically grounded power source and at least one conduit connected to the electrically driven oxygen separator(s) is also grounded to prevent a shock hazard. More particularly, the present invention relates to such an electrochemical cell assembly in which the conduit or conduits are formed in whole or in part of an electrically insulating and electrochemically resisting ceramic material comprising distinct phases of magnesia and spinel to prevent electrical conduction and electrochemical reduction.

BACKGROUND OF THE INVENTION

Electrically driven oxygen separators incorporate an electrolyte that is formed of a ceramic that is capable of conducting oxygen ions at elevated temperatures. An electrical potential is applied to opposite sides of the electrolyte through cathode and anode electrodes. The oxygen ionizes at the cathode and oxygen ions are driven through the electrolyte. The oxygen ions recombine with the anode with the loss of electrons.

For example, in U.S. Pat. No. 5,871,624, a series of modules is formed by injection of molding in ionic conducting ceramic electrolyte. The molded device has a series of tubes that extend from a general planar tube support member. The outer surfaces of the tubes and the interior of the tubes are coated with electrically conductive materials to form electrode surfaces separated by the electrolyte. Electrical connections to the electrodes are made through vias or holes extending through the ceramic electrolyte.

The aforementioned modules may be connected together and housed within a furnace in which the electrically driven oxygen separators are heated to their operational temperature by means of electrical heaters. An oxygen containing gas, for example air can be introduced into the furnace by way of a blower. A conduit in the form of a product tube is connected to oxygen separators to discharge the separated oxygen from the electrically driven oxygen separators. The product tube can be attached to the electrolyte by a glass seal such as described in U.S. Pat. No. 6,532,769. In order to provide thermal expansion capability between the product tube and the electrolyte, the product tube is fabricated from the same material as the electrolyte. For example, if the electrolyte were fabricated from gadolinium dopes ceria, the product tube can be fabricated from gadolinium doped ceria. Since the power supply is grounded and such a product tube, can, at least to a limited extent, be electrically conductive, a shock hazard is presented that is overcome by grounding the product tube.

It has been found, however, that where the product tube is formed of the same material as the electrolyte or other ionic conductive material, over time, the tube will decompose due to electrochemical reduction reactions between the ceramic due to an electrical potential that exists along the length of the product tube, between the electrically driven oxygen separators and ground due to the grounded power source.

It is to be noted that in other type of electrically driven oxygen separators, an inlet conduit is provided to introduce an oxygen containing gas into the electrically driven separator or separators and an outlet conduit is provided to discharge oxygen depleted retentate from the separator. Since such electrically driven oxygen separators are also powered by a grounded power source and the inlet and outlet conducts are grounded, the inlet and outlet conduits can again be subject to an electrical potential and also degrade over time.

As will be discussed, the present invention provides an electrochemical cell assembly that utilizes a material in the fabrication of the conduit, used either as the product tube or other conduit connected to the electrically driven separator that is designed to prevent such deterioration as discussed above by virtue of its electrically insulating and electrochemical reduction resistive properties.

SUMMARY OF THE INVENTION

The present invention provides an electrochemical cell assembly that comprises at least one electrically driven oxygen separator having an electrical potential applied thereto and to ground. At least one conduit is provided for use in at least one of introducing an oxygen containing gas into the at least one electrically driven oxygen separator and for discharging oxygen separated from the oxygen containing gas from the at least one electrically driven oxygen separator. The at least one conduit is grounded and connected to the at least one oxygen separator so that an electrical potential is created along the length of the at least one conduit. The at least one conduit is formed in whole or in part of a ceramic material that is an electrical insulator and is also resistant to electrochemical reduction. The electrically insulating ceramic material comprises distinct phases of magnesia ("MGO") and spinel ("$MgAl_2O_4$").

The electrically insulated ceramic material can be bonded to the electrolyte by a glass seal. Where the electrolyte is gadolinium doped ceria, the electrically insulated ceramic material contains between about 62 percent by weight and about 92 percent by weight magnesia, between about 4 percent by weight and about 34 percent by weight spinel and between about 0 percent by weight and about 19 percent by weight yttrium aluminate, for example, $YAlO_3$, $Y_3Al_5O_{12}$, and $Y_4Al_2O_9$. More preferably, the electrically insulating ceramic material can contain between about 75 percent by weight and about 95 percent by weight magnesia, between about 17 percent by weight and about 21 percent by weight spinel and between 2 percent by weight and about 6 percent by weight yttrium aluminate.

Where the electrolyte is yttrium doped zirconia, the electrically insulating ceramic material can contain between about 57 percent by weight and about 87 percent by weight magnesia and between about 13 percent by weight and about 43 percent by weight spinel. Preferably, in such case, the electrically insulating ceramic material contains between about 70 percent by weight and about 74 percent by weight magnesia and between about 26 percent by weight and about 30 percent by weight spinel.

Since the conduit or conduits are formed in whole or in part of the ceramic insulator that is resistant to electrochemical reduction, the conduit will not deteriorate.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

DETAILED DESCRIPTION

Figure 1:
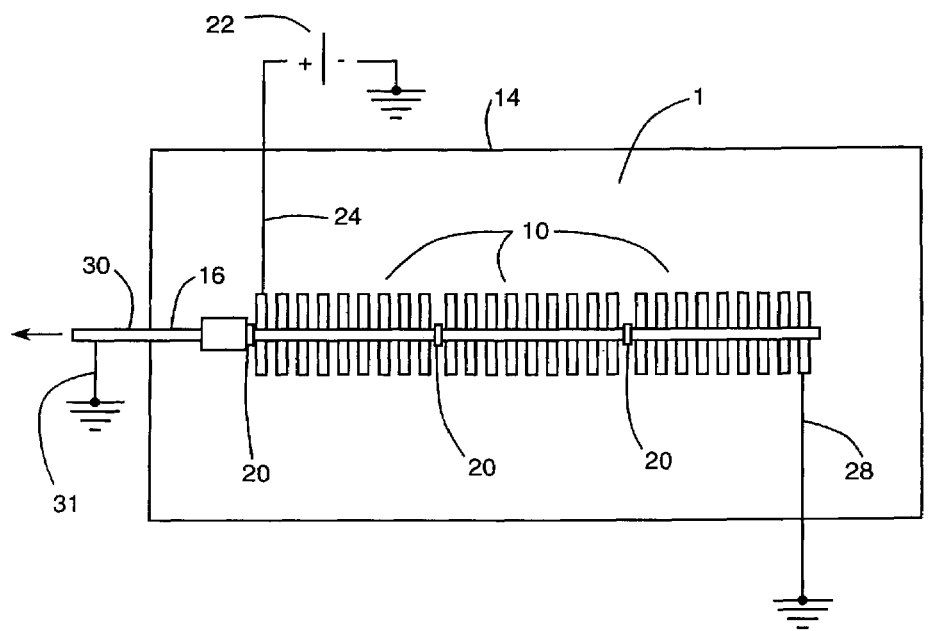
FIG. 1 is a simplified schematic of an electrochemical cell assembly in accordance with the present invention.

With reference to the Figures, an electrochemical cell assembly 1 is illustrated. Electrochemical cell assembly 1 includes electrically driven oxygen separators 10 that are located within a furnace 14 having electrical heaters (not illustrated, but well known in the art) to heat the electrically driven oxygen separators 10 to their operational temperature at which oxygen ions will be conducted and oxygen will thus, be separated. It is to be noted that other well known features of furnace 14 and associated equipment are not illustrated for purposes of simplicity of explanation such as controls and thermal insulation and etc. In this regard, an oxygen containing stream, for example air, can be introduced into furnace 14 by a blower for separation of oxygen by the electrically driven oxygen separators 10. The electrically driven oxygen separators 10 are of the type illustrated in U.S. Pat. No. 5,871,624. A conduit 16, that serves as a product pipe, is connected to electrically driven oxygen separators 10 to discharge oxygen separated from an oxygen containing stream that is introduced into furnace 14. Each of the electrically driven oxygen separators 10 are connected to one another and to the conduit 16 by means of glass seals 20 of the type disclosed in U.S. Pat. No. 6,532,769. It is to be noted that in such glass seals, mixtures of barium, calcium alumino silicate are heated so that the mixture melts and then crystallizes to form a glass ceramic that will adhere to the surfaces to be joined. The forgoing seal and bonding method, however, is given herein for exemplary purposes and no particular bonding method is preferred for purposes of the present invention.

Although not illustrated, the outer surfaces of electrically driven oxygen separators 10 are covered with a layer of an electrically conductive material to serve as a cathode electrode and the internal surfaces of electrically driven oxygen separators 10 are coated with a layer of an electrically conductive material to serve as an anode electrode. Both the cathode electrode and the anode electrode are in turn covered by a current collector for making a connection between electrical conductors and the cathode and anode electrodes. The cathode electrode and the anode electrode sandwich an electrolyte that is capable of conducting oxygen ions at elevated temperature and that also serves to provide structural integrity.

An electrical power source 22 is connected to the current collector associated with the anode electrode by way of an electrical conductor 24. Since the anode is located on the inside, electrical contact is made by way of a via. The other connection made by electrical power source 22 is to ground by way of a grounded conductor 28 connected to the current collector associated with the cathode electrode.

The electrolyte of each of the electrically driven oxygen separators 10 can be, for example, gadolinium doped ceria that, as mentioned above, is sandwiched between the cathode and anode electrodes. When the electrical potential is applied to the electrically driven oxygen separators 10, the oxygen ionizes at the cathode electrodes and the resultant oxygen ions recombine at the anode electrodes into elemental oxygen within the interior of the electrically driven oxygen separators 10. The oxygen passes from the electrically driven oxygen separators to the conduit 16 as a stream 30. Conduit 16 is also grounded for safety purposes such as have been described above by way of a conductor 31. This creates a potential between the electrically driven oxygen separators 10 and ground along the length of the conduit 16. The potential can cause electrochemical reduction of the metallic oxide used in forming the conduit 16, which in the prior art would be the same material as the electrolyte for thermal expansion compatibility.

As mentioned above, the electrolyte of the electrically driven oxygen separator 10 can be formed of gadolinium doped ceria. In accordance with the present invention, the conduit 16 is formed of a ceramic material that contains between about 62 percent by weight and about 92 percent by weight magnesia, between about 4 percent by weight and about 34 percent by weight spinel and between about 0 percent by weight and about 90 percent by weight yttrium aluminate. In order to obtain the closest thermal expansion match, the ceramic material is preferably between about 75 percent and about 95 percent by weight magnesia, between about 17 percent by weight and about 21 percent by weight spinel and between about 2 percent by weight and about 6 percent by weight yttrium aluminate. Such materials are electrical insulators that prevent the conduction of electrons along the length of the conduit 16 and thereby to prevent electrochemical reduction of the ceramic materials. Furthermore, since such materials are highly resistant to electrochemical reduction, they do not deteriorate over time as would be the case if conduit 16 were formed of gadolinium doped ceria.

Figure 2:
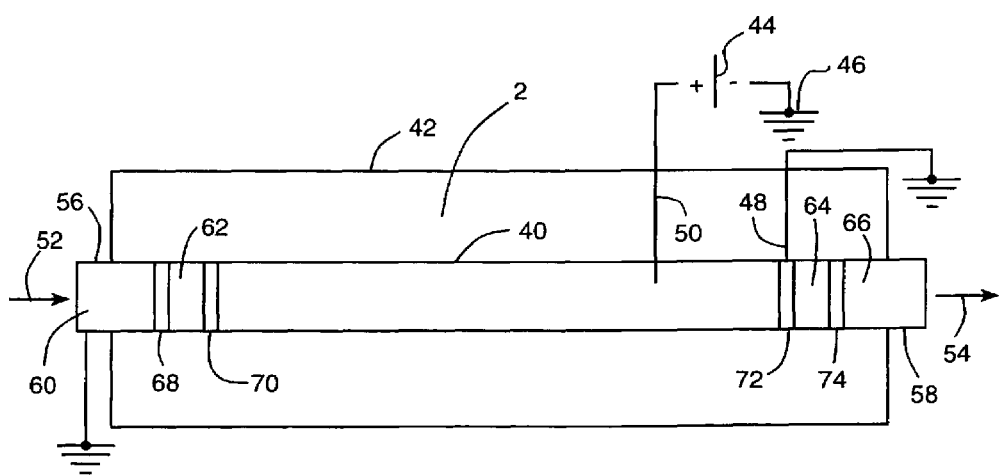
FIG. 2 is a simplified schematic of an alternative embodiment of an electrochemical cell assembly in accordance with the present invention.

It is to be noted that there is no particular form of the electrochemical cell that is preferred and the present invention has application to any such device, for example, an electrochemical cell that is used to separate oxygen for purposes of purifying an oxygen containing stream. Such a purification device is illustrated, again, on a simplified basis, in FIG. 2. In FIG. 2, an electrochemical cell assembly 2 is illustrated that has an electrically driven oxygen separator 40 in the form of a tube that is located within a furnace 42 having heaters, again, not illustrated.

Electrically driven oxygen separator 40 has an outer layer of electrically conductive material forming the anode electrode and an inner layer of material forming the cathode electrode. The cathode electrode and the anode electrode sandwich an electrolyte material that can be yytrium stabilized zirconia. Current collector layers are in turn provided on the cathode and anode electrodes to provide electrical connection to the electrically driven oxygen separator 40.

An electrical power source 44 is provided that is grounded by way of an electrical conductor 46. The cathode electrode is grounded by way of an electrical conductor 48. The anode electrode is connected to the electrical power source 44 by way of a conductor 50.

When a current is applied to the electrically driven oxygen separator 40 by current source 44 and an oxygen containing stream 52 is passed through one end of the electrically driven oxygen separator 40, oxygen separates from such oxygen containing stream 52 to expel an oxygen depleted retentate stream 54 from the other end of the electrically driven oxygen separator 40 which is thereby purified of the oxygen. Oxygen that has been separated is simply discharged to the atmosphere, but if necessary could also be collected.

The oxygen containing stream 52 is passed into an inlet conduit 56 and the retentate 54 is discharged from an outlet conduit 58 connected to the electrically driven oxygen separator 40. Both the inlet conduit 56 and the outlet conduit 58 are grounded setting up a potential difference to ground and therefore, electrochemical reduction in the material used in forming the same. Each of the inlet conduit 56 and the outlet conduit 58 can be formed of two sections 60, 62; and 64, 66 that are connected to one another and to opposite ends of the electrically driven oxygen separator 40 by glass seals 68, 70, 72 and 74. One section, for example 62 and 64 of the inlet and outlet conduits 56 and 58, respectively, can be formed of the yytrium stabilized zirconia. The other two sections 60 and 66 can be formed of an electrically insulating ceramic material that is also resistive to electrochemical reduction. The material preferably contains between about 50 percent by weight and about 87 percent by weight magnesia and between about 13 percent by weight and about 43 percent by weight spinel. More preferably, the ceramic material contains between about 70 percent by weight and about 74 percent by weight magnesia and between about 26 percent by weight and about 30 percent by weight spinel. Again, such material is not only an electrical insulator to prevent electrochemical reduction of the inlet and outlet 56 and 58, but also has been found to be resistant to electrochemical reduction so as to prevent the inlet and outlet 56 and 58, respectively, from degrading through electrochemical reduction reactions.

By way of example, conduit 16 can be formed by combining magnesia, aluminum and yttrium oxide powders in the correct stoichiometric amounts and then ball milling the same for 24 hours to achieve homogeneity. Alternatively, powders of spinel and yttrium aluminate could be first synthesized and then mixing the same with magnesia. Ball mill powders are then screened through 100 mesh screen to remove agglomerates. The powders are mixed with binders and blended at high temperatures, palletized and injection molded to shape and to form conduit 16 as a green form. Thereafter, such green form is then heated to remove the solvent and sintered at a temperature of between about 1450° C. and about 1515° C. The final composite will contain 3 distinct phases of magnesia, spinel and yttrium aluminate.

While the present invention has been described with reference to a preferred embodiment, as will occur to those skilled in the art, numerous changes, additions and omissions can be made without departing from the spirit and the scope of the present invention as recited in the presently pending claims.

We claim:

1. An electrochemical cell assembly comprising:
    at least one electrically driven oxygen separator having an electrolyte capable of oxygen ion transport under application of electrical potential to separate oxygen from an oxygen containing gas, the at least one electrically driven oxygen separator connected to a ground;
    an electrical power source connected to the at least one electrically driven oxygen separator and to the ground so that an electrical potential generated by the electrical power source is applied between the at least one electrically driven oxygen separator and to the ground and therefore, the electrolyte thereof; and
    at least one conduit for use in one of introducing the oxygen containing gas into the at least one electrically driven oxygen separator and for discharging the oxygen separated from the oxygen containing gas from the at least one electrically driven oxygen separator, the at least one conduit connected to the ground and connected to the at least one oxygen separator so that the electrical potential applied to the electrically driven oxygen separator also creates another potential along the length of the at least one conduit;
    said at least one conduit formed in whole or in part of a ceramic material that is an electrical insulator and is also resistant to electrochemical reduction, the ceramic material comprising distinct phases of magnesia and spinel.

2. The electrochemical cell assembly of claim 1, wherein the electrically insulating ceramic material is bonded to the electrolyte by a glass seal.

3. The electrochemical cell assembly of claim 2, wherein:
    the electrolyte is gadolinium doped ceria; and
    the electrically insulating ceramic material contains between about 62 percent by weight and about 92 percent by weight magnesia, between about 4 percent by weight and about 34 percent by weight spinel and between about 0 percent by weight and about 19 percent by weight yttrium aluminate.

4. The electrochemical cell assembly of claim 2, wherein:
    the electrolyte is gadolinium doped ceria; and
    the electrically insulating ceramic material contains between about 75 percent by weight and about 95 percent by weight magnesia, between about 17 percent by weight and about 21 percent by weight spinel and between about 2 percent by weight and about 6 percent by weight yttrium aluminate.

5. The electrochemical cell assembly of claim 2, wherein:
    the electrolyte is yttrium doped zirconia; and
    the electrically insulating ceramic material contains between about 57 percent by weight and about 87 percent by weight magnesia and between about 13 percent by weight and about 43 percent by weight spinel.

6. The electrochemical cell assembly of claim 2, wherein:
    the electrolyte is yttrium doped zirconia; and
    the electrically insulating ceramic material contains between about 70 percent by weight and about 74 percent by weight magnesia and between about 26 percent by weight and about 30 percent by weight spinel.

* * * * *